United States Patent

[11] 3,581,589

| [72] | Inventor | Baird E. Resener<br>Indianapolis, Ind. |
|---|---|---|
| [21] | Appl. No. | 868,507 |
| [22] | Filed | Oct. 22, 1969 |
| [45] | Patented | June 1, 1971 |
| [73] | Assignee | Amsted Industries Incorporated<br>Chicago, Ill. |

[54] CHAIN LINK PLATE AND METHOD
3 Claims, 2 Drawing Figs.

[52] U.S. Cl. .................................................. 74/250,
59/8, 59/15, 59/91
[51] Int. Cl. ............................................. F16g 13/02,
F16g 13/08, B21s 9/04
[50] Field of Search ........................................ 74/250 R;
59/8, 15, 91

[56] References Cited
UNITED STATES PATENTS

| 372,252 | 10/1887 | Butterworth et al. | 74/250 |
| 3,321,907 | 5/1967 | Dewing et al. | 74/250X |
| 3,359,815 | 12/1967 | Jeffrey et al. | 74/250 |

Primary Examiner—Leonard H. Gerin
Attorneys—Walter L. Schlegel Jr. and Norvell E. Von Behren ABSTRACT: An improved link plate for a power transmission chain is disclosed, the chain having a plurality of metallic hoops surrounding the apertures of the link plate. The use of the loops increase the cross-sectional area of the link plate and decrease the stress created by a given interference fit of the assembled mating pin or bushing member and the tensile load imposed on the chain. In addition, the hoops serve to separate adjacent link plates thereby preventing these links from rusting together when the chain is not in use. Also disclosed is a method for forming the hoops by taper drifting a pair of pierced apertures.

PATENTED JUN 1 1971 3,581,589
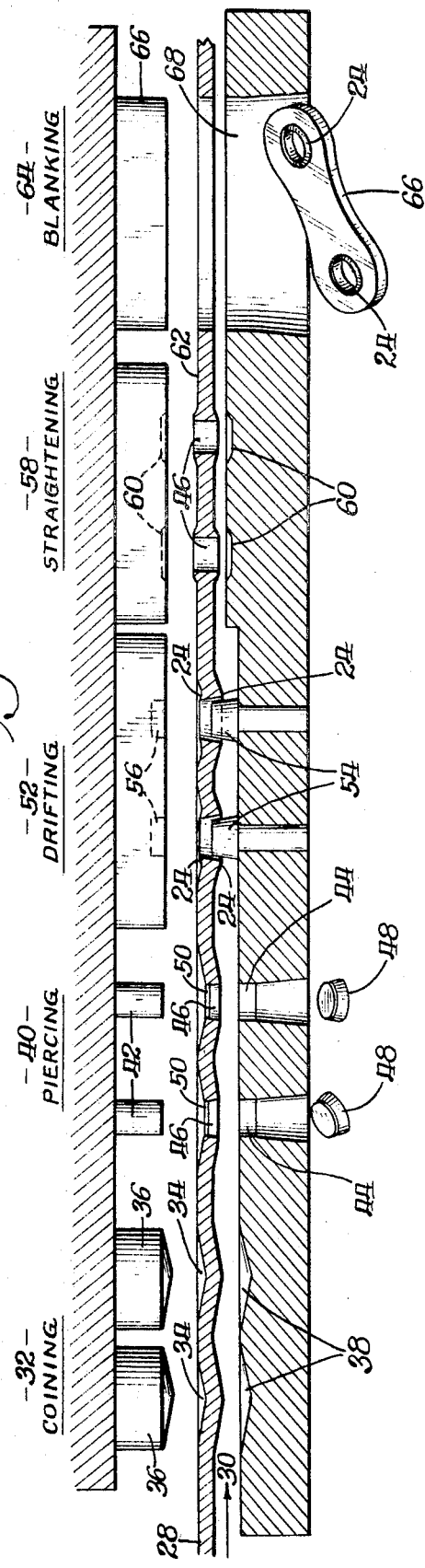
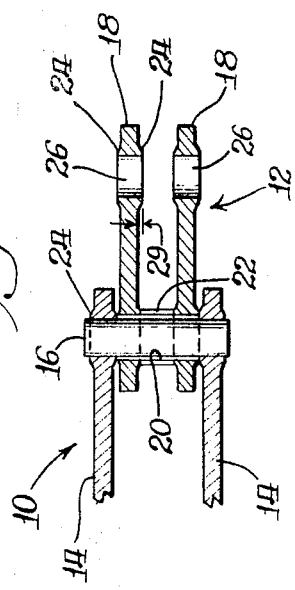
Inventor:
Baird E. Resener

CHAIN LINK PLATE AND METHOD

BACKGROUND OF THE INVENTION

This invention relates in general to power transmission chains and in particular to a new and novel improved chain link plate and method for manufacturing the same.

Failure of a power transmission chain can result whenever a fatigue fracture of one of the link plates causes the chain to break after repeated load cycles. Since the stresses are usually highly concentrated on the surface of the apertures, which are the principal load-carrying portions of the link plate, various means have been attempted to improve the stress levels in this area.

One recent attempt is illustrated in the U.S. Pat. No. 3,359,815, to Jeffrey et al., wherein the inventors used a reinforcing buttressing material around the link plate apertures to augment its strength and fatigue resistance and in addition, provided bell-mouthed apertures for optimum residual stress distribution patterns. The bell-mouthed apertures were formed in the conventional manner by ballizing the apertures to circumferentially stretch the aperture material and then removing the drift to leave the material in a state of circumferential compression.

By the use of the reinforcing buttressing material in this manner, the inventors were required to also provide the waist portion of the link plate with an indentation on each side thereof in order to make the link plate somewhat lighter to offset the additional material in the buttress section.

SUMMARY OF THE INVENTION

The present invention overcomes the difficulties inherent in prior-art link plates and provides a new and novel link plate having a plurality of metallic hoops formed surrounding the apertures to decrease the aperture stress level thereby minimizing fatigue failure and allowing greater imposed chain loads and/or greater interference fits of the assembled mating pin or bushing member before a damaging stress level is reached. The hoops are formed by a new and novel method of manufacturing by the use of taper drifts in the apertures as will be more fully described hereinafter.

The hoops formed by the method disclosed herein, also serve to separate the adjacent link plates of the power transmission chain to prevent the plates from rusting together during extended nonuse of the chain.

Accordingly, it is an object of the invention to provide a new and novel chain link plate having a plurality of stress-decreasing hoops surrounding the apertures of the plate.

Another object of the invention is to provide a new and novel link chain having link plates that will not rust completely together to prevent operation of the chain after extended periods of nonuse as in agricultural service.

Still another object of the invention is to provide a new and novel method for manufacturing the link plates of the invention wherein the stress-decreasing hoops of the invention are formed integrally with the formation of the link plate.

These and other objects and advantages will be apparent from a study of the attached drawing and from a reading of the description of the preferred embodiment.

BRIEF DESCRIPTION OF THE DRAWINGS

FIG. 1 is sectional view of the plurality of link plates in assembled position to form a chain link; and FIG. 2 is a schematic progression showing the method for forming the link plates of the invention.

DESCRIPTION OF THE PREFERRED EMBODIMENT

Referring to FIG. 1 of drawing there is shown a sectional view of one link connection of a roller power transmission chain and comprises generally a pin link 10 and a roller link 12. The pin link 10 is an outside link and comprises two pin link plates 14 which are assembled with a pair of pins 16. The roller link 12 comprises a pair of roller link plates 18, two bushings 20 and a pair of rollers 22.

Formed on each side of the roller link plates 18 and the pin link plates 14 are a plurality of stress-decreasing hoops 24 which surround the apertures 26 of the respective link plates and are formed as more fully described hereinafter. The hoops 24 serve to decrease the stress levels around the apertures 26 in such a manner as to minimize fatigue failures occurring at the apertures 26 without appreciably increasing the overall weight of the link plate members as often occurred in prior-art devices.

The stress-decreasing hoops 24 also serve to separate the pin link plates 14 from the roller link plates 18 by an amount equal to the distance 29 of two hoops 24. This separation of the link plates by the hoops 24 allows the power transmission chain to be used in agricultural service with long periods of nonuse without the link plates rusting together and forming a tight joint making the chain unusable.

The formation of the improved link plates of the invention by the new and novel method will now be explained in detail by referring to FIG. 2 of the drawing wherein there is shown a schematic representation of the method.

A length of link plate stock 28, alternately pausing and advancing in the direction of the arrow 30, enters between a series of punches and dies at the various stations in the order shown in FIG. 2.

The first station 32 is a coining process wherein the link plate stock 28 is depressed into a pair of cone-shaped depressions 34 by a pair of coining punches 36 and a pair of coining dies 38 in a well-known manner.

Leaving the first station 32 the link plate stock 28 passes to the piercing station 40 wherein the central portion of each cone-shaped depression 34 is pierced by a pair of piercing punches 42 against a piercing die 44 to form a pair of tapered pierced apertures 46 while a pair of plugs 48 are removed to be scrapped in a well-known manner. When the link plate stock 28 is pierced in this manner, a slight-walled cut 50 of about one-tenth to one-third of the stock thickness is left at the punch end of the aperture. The remainder of the aperture is tapered by an amount dictated by the clearance between the piercing punch 42 and the die 44.

After the piercing operation the link plate stock 28 passes to the third station 52 of the method wherein a pair of tapered drifts 54 are inserted into the pair of tapered pierced apertures 46 from the bottom side thereof to straighten the slight-walled cut 50 while holding the link plate stock rigid with a pair of mating dies 56. The continued forcing of the tapered drifts 54 upward will cause the metal surrounding the aperture to swell around the holes as the hole is enlarged forming a plurality of stress-decreasing hoops 24 surrounding each side of each aperture.

The tapered pierced apertures 46 are thereby rendered perpendicular to the cone-shaped depressions 34 and the walled cut 50 is forcibly blended with the remainder of aperture 46 so as to have a uniformly tapered diameter along its entire length. The link plate stock then passes to the straightening station 58 where the cone-shaped depressions 34 are removed by a plurality of straightening dies 60 thereby causing the pierced apertures 46 to become cylindrical shaped and perpendicular to the face 62 of the link plate stock. A link plate formed in this manner will have a substantially uniform thickness throughout the length of the link plate except for the hoop areas surrounding the apertures.

The final step of the method comprises a cutting station 64 wherein the link plate stock is cut or blanked into the finished link plate 66 by a blanking punch 66 and mating die 68. The finished link plate 66 thus formed contains a plurality of stress-decreasing hoops 24 formed integrally with the link plate and surrounding each aperture on both sides of the link plate for the use and purposes hereinbefore described.

From the foregoing, it can be seen that there has been provided a new and novel power transmission link plate and method for manufacturing the same to accomplish all of the objects and advantages of the invention. Nevertheless, it is apparent that many changes in details of construction may be made without departing from the spirit and scope of the invention as expressed in the accompanying claims and the invention is not to be limited to the exact matters shown and described since the preferred embodiments have been given by way of illustration only.

Having described the invention, I claim:

1. An improved link plate for a power transmission chain comprising, in combination:
   a. the link plate having a pair of end portions and a waist portion;
   b. each end portion having an aperture formed laterally therethrough for receiving a mating member and pivotally interconnecting adjacent pairs of said link plates to form the power transmission chain; and
   c. a plurality of hoops formed on each side of said link plates and surrounding said apertures for decreasing the stress levels around said apertures; said hoops also serving to separate the adjacent link plates by an amount equal to the height of two hoops thereby preventing said adjacent link plates from forming a tight joint by rusting together during a period of inactivity.

2. The link plate as defined in claim 1 wherein said end and waist portions have substantially a uniform thickness throughout the length of said link plate and said hoops are formed integrally with the link plate.

3. A method for manufacturing an improved link plate for a power transmission chain from a link plate stock comprising the steps of:
   a. coining a pair of cone-shaped depressions into the link plate stock;
   b. piercing the central portion of each cone-shaped depression to form a pair of partially tapered pierced apertures;
   c. inserting a taper drift into the partially tapered pierced aperture to cause the aperture to become uniformly tapered and the material around the tapered pierced aperture to swell thereby forming a hoop surrounding both sides of each aperture and causing the tapered aperture to become perpendicular to the cone-shaped depression;
   d. straightening the pierced apertures to remove the cone-shaped depressions thereby causing the pierced apertures to become cylindrical and perpendicular to the face of the link plate; and
   e. cutting the link plate stock around the pair of pierced apertures to form the finished link plate.